United States Patent
Genies et al.

(10) Patent No.: US 8,710,349 B2
(45) Date of Patent: Apr. 29, 2014

(54) PHOTOVOLTAIC SYSTEM WITH INTEGRATED PHOTOVOLTAIC PANEL AND BATTERY

(75) Inventors: Sylvie Genies, St Egreve (FR); Helene Rouault, Le Versoud (FR)

(73) Assignee: Commissariat a l'Energie Atomique et aux Energies Alternatives, Paris (FR)

(*) Notice: Subject to any disclaimer, the term of this patent is extended or adjusted under 35 U.S.C. 154(b) by 351 days.

(21) Appl. No.: 13/063,560

(22) PCT Filed: Sep. 9, 2009

(86) PCT No.: PCT/EP2009/061676
§ 371 (c)(1),
(2), (4) Date: Mar. 11, 2011

(87) PCT Pub. No.: WO2010/029099
PCT Pub. Date: Mar. 18, 2010

(65) Prior Publication Data
US 2011/0165441 A1    Jul. 7, 2011

(30) Foreign Application Priority Data
Sep. 12, 2008   (FR) ..................... 08 56151

(51) Int. Cl.
*H01L 31/042* (2006.01)
(52) U.S. Cl.
USPC ........................................ 136/244
(58) Field of Classification Search
None
See application file for complete search history.

(56) References Cited

U.S. PATENT DOCUMENTS

2003/0038610 A1* 2/2003 Munshi et al. .......... 320/101
2008/0088272 A1   4/2008 Yang

FOREIGN PATENT DOCUMENTS

| CN | 1558526 A | 12/2004 |
| DE | 91 01 417 U1 | 6/1992 |
| JP | 11054780 A * | 2/1999 |
| JP | 2003115602 A * | 4/2003 |

OTHER PUBLICATIONS

JP2003-410134 machine English translation.*
JP 11-54780 A—machine English translation.*
English machine translation of JP 11054780A.*
English machine translation of JP 2003115602A.*
Preliminary Search Report issued Jun. 2, 2009 in French Patent Application No. FR 0856151 FA 715466 (with English translation of category of cited documents).
Chinese Office Action issued Nov. 21, 2012, in China Patent Application No. 200980135858.6 (English translation only).

* cited by examiner

*Primary Examiner* — Patrick Ryan
*Assistant Examiner* — Lucas J O'Donnell
(74) *Attorney, Agent, or Firm* — Oblon, Spivak, McClelland, Maier & Neustadt, L.L.P.

(57) ABSTRACT

A photovoltaic system including: one photovoltaic panel including a face configured to receive light rays, one battery mechanically connected to the photovoltaic panel by a retaining structure, and one space which is opened onto the environment external to the photovoltaic system forming an air layer separating the battery and the photovoltaic panel and including a thickness at least equal to approximately 1 cm. The ratio between the thickness of the photovoltaic system and a dimension of one side of the face of the photovoltaic panel is less than or equal to approximately ⅕.

13 Claims, 4 Drawing Sheets

PHOTOVOLTAIC SYSTEM WITH INTEGRATED PHOTOVOLTAIC PANEL AND BATTERY

TECHNICAL FIELD

The invention relates to a photovoltaic system integrating into a single device several functions such as the conversion of the solar energy into electrical energy, the storage of the electrical energy produced or the management of the electrical energy produced.

PRIOR ART

Photovoltaic systems that make possible the storage of the electrical energy produced, operating autonomously or connected to an electric network, comprise several separate components:
- one or several photovoltaic panels, or solar panels, formed by matrices of photovoltaic cells and carrying out the conversion of the solar energy received into electrical energy,
- one or several batteries storing the electrical energy produced by the photovoltaic panel(s),
- an electronic system for managing the electrical energy produced.

Figure 1:
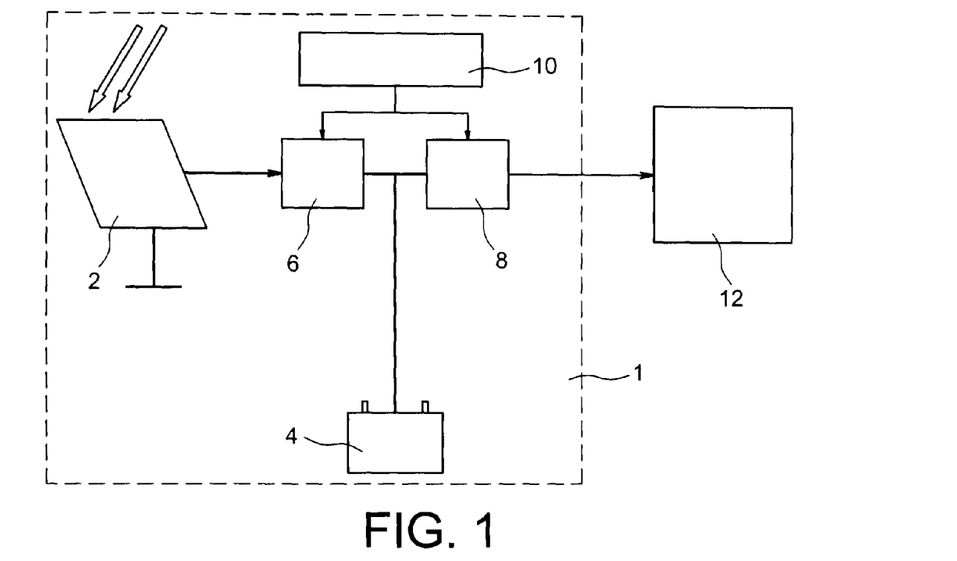
FIGS. 1 and 2 show respectively a diagram of an autonomous photovoltaic system and a diagram of a photovoltaic system connected to an electric network according to prior art.

A diagram of an autonomous photovoltaic system 1, used for example to power a telecommunications device, a piece of urban furniture, an isolated site such as a home or a vehicle, is shown in FIG. 1. This photovoltaic system 1 comprises a photovoltaic panel 2, an electro-chemical battery 4, a switch or a DC/DC voltage converter 6 (also called DC/DC converter), a switch or a DC/DC converter or an inverter 8, as well as an electronic system for managing energy 10, or control panel, controlling the components referenced as 6 and 8. This photovoltaic system 1 is intended to power a device 12. These components are connected together by electric cables and may be more or less separated from one another.

When the component 6 is a switch, that latter makes it possible to connect or not connect the output of the photovoltaic panel 2 to the other components of the photovoltaic system 1. When the component 6 is a DC/DC converter, the latter makes it possible to convert the DC voltage obtained at the output of the photovoltaic panel 2 into a DC voltage adapted to the tension of the battery 4. When the component 8 is a switch, the latter makes it possible to connect or not connect the output of the component 8 to the device 12. When the component 8 is a DC/DC converter or an inverter, the latter makes it possible to convert the DC voltage obtained at the output of the component 6 into a DC or AC voltage corresponding to the operating voltage of the device 12.

Figure 2:
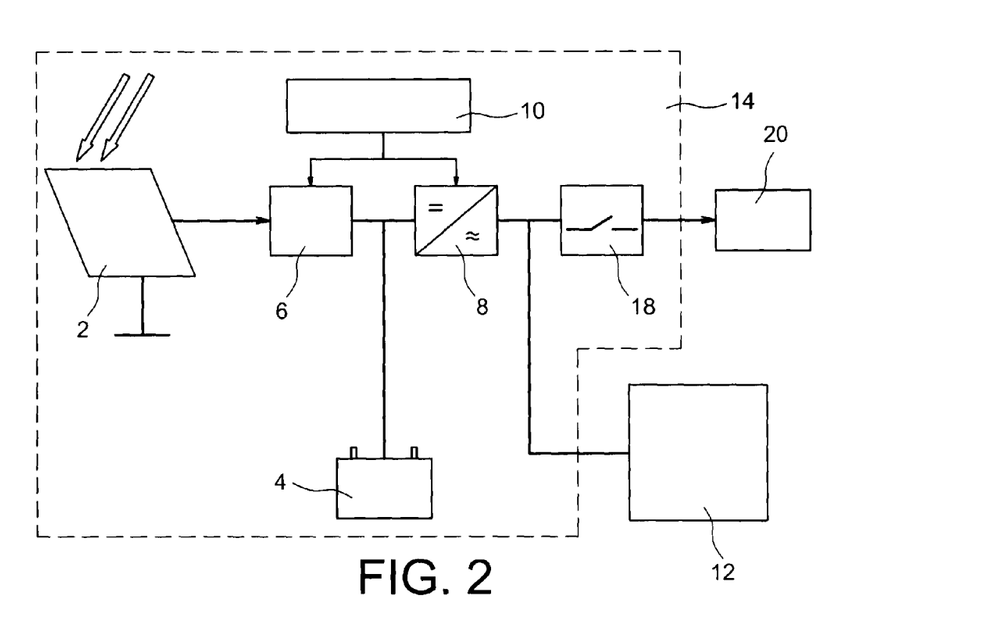

A diagram of a photovoltaic system 14 connected to an electric network 20, making it possible, in addition to powering the device 12, to provide the electric network 20 with the electrical energy produced by the photovoltaic system 14, is shown in FIG. 2. Compared to the autonomous photovoltaic system 1 shown in FIG. 1, this photovoltaic system 14 comprises a switch 18, controlled by the electronic system for managing energy 10 and making it possible to connect or not connect the output of the inverter 8 to the electric network 20.

In these photovoltaic systems, the lead-acid technology is the most widespread technology for manufacturing batteries, substantially due to its moderate cost and its availability. However, such batteries have a mass energy and a volume energy that are relatively low, respectively equal to approximately 40 Wh/kg and 80 Wh/L, which corresponds to a high occupied volume and weight per kWh stored.

The weight and the volume of the batteries are major constraints when transporting (in particular when the photovoltaic systems are isolated or are far from road infrastructures) and when installing photovoltaic systems. The encumbrance of the batteries is also highly limiting for isolated applications such as urban furniture where space is often limited. The installation of lead-acid batteries thus generates an additional cost for the camouflaging of the batteries in decorative elements such as concrete bases or benches, or for the burial of these batteries. In the case of isolated photovoltaic systems or connected to the electric network and incorporated into a structure, this encumbrance is also a constraint since the presence of lead-acid batteries implies providing a technical room for their storage. In addition, in the event of an increase in energy needs, and therefore an increase in the power of the photovoltaic systems, the space initially provided for storing batteries may become limiting and prevent the redimensioning of the installation.

There are also batteries made with lithium, for example of the lithium-ion type, having a mass energy and a volume energy that are higher (respectively between approximately 100 Wh/kg and 150 Wh/kg, and between approximately 150 Wh/L and 200 Wh/L) than those of lead-acid batteries. In addition, these batteries can be manufactured in diverse shapes: cylindrical, prismatic, flat, etc. Lithium moreover has other advantages compared to lead, such as a longer life span (of a magnitude of 20 years and 3000 cycles at 100% use for batteries produced in the form of flat plates, compared to 3 years for lead), better energy efficiency (this efficiency corresponds to the number of kWh returned by the battery compared to the kWh injected into the battery) and an absence of maintenance, which finally renders the cost per kWh returned for these batteries equivalent or less than that of lead batteries when the usage profile of the application requires successive charge-discharge cycles at high depths of discharge ($\geq 50\%$ of the nominal capacity).

Figure 3:
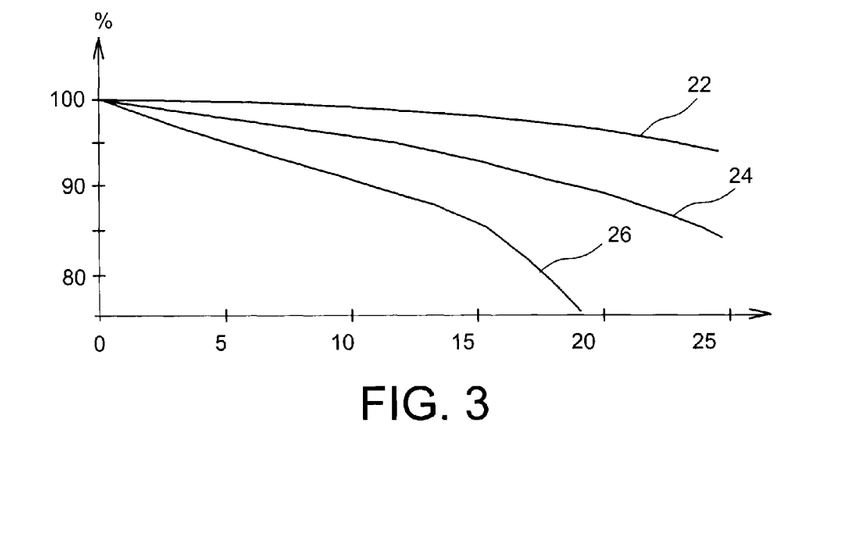
FIG. 3 shows curves showing the change, according to years, of the storage capacity of a lithium-ion battery compared to its initial storage capacity, at different operating temperatures.

The life span of the batteries, whether they are of the lead-acid or lithium-ion type, is as such highly influenced on the one hand by the depths of discharge reached during the charge-discharge cycles, and on the other hand by the temperature of the environment wherein they are operating. The curves 22, 24 and 26 shown in FIG. 3 show the change, according to years, of the storage capacity of a lithium-ion battery compared to its initial storage capacity, respectively at an operating temperature of 20° C., 40° C. and 60° C., for a given depth of discharge. These curves clearly show that an increase in the ambient operating temperature results in a drop in the life span of the battery.

As such, when it is not possible to store batteries in a temperature-controlled zone, for example in a technical room with air conditioning, the life span of the batteries is reduced, regardless of the depth of discharge reached. In addition, burying batteries, although this makes it possible to reduce the heat fluctuations of the operating environment of the batteries, hinders maintenance and regular follow-up of the operation of the batteries, subsequently reducing the life span of the batteries.

DESCRIPTION OF THE INVENTION

A purpose of this invention is to propose a compact multifunctional photovoltaic system integrating in particular the functions of converting the solar energy into electrical energy and of storing the electrical energy produced within a single autonomous device, facilitating as such its integration and its installation in any type of site, regardless of whether it is isolated or connected to an electric network, and also making it possible to prevent the deteriorations as time passes in its capacities to store the electrical energy produced.

For this, a photovoltaic system is proposed comprising at least:
one photovoltaic panel,
a battery mechanically connected to the photovoltaic panel by a retaining structure,
a space which is opened onto the environment external to the photovoltaic system and separating the battery and the photovoltaic panel by a distance at least equal to approximately 1 cm.

The space separating the battery and the photovoltaic panel can form a space for the circulation of air between the battery and the photovoltaic panel.

As such, no component of the photovoltaic system compromises the life span of the other components of the system, in particular of the battery, due to the heat released during the operation of the system, and in particular of the photovoltaic panel. This method of integration as such guarantees a comparable life span between all of the components of the system, also by limiting the impact of the ambient temperature and of the radiation received on the various integrated components.

This invention further relates to a photovoltaic system comprising at least:
one photovoltaic panel comprising a face intended to receive light rays,
one battery mechanically connected to the photovoltaic panel by a retaining structure,
one space which is opened onto the environment external to the photovoltaic system forming an air layer separating the battery and the photovoltaic panel and comprising a thickness at least equal to approximately 1 cm,
the ratio between the thickness of the photovoltaic system and a dimension of one side of said face of the photovoltaic panel being less than or equal to approximately $1/5$.

Such a photovoltaic system therefore has a planar shape, i.e. a low thickness compared to the other dimensions of the system. This system therefore makes it possible to guarantee a comparable life span between all of the components of the system, by also limiting the impact of the ambient temperature and of the radiation received on the various integrated components, while still providing a high degree of compactness of the system.

The distance separating the battery and the photovoltaic panel, i.e. the thickness of the air layer, may be between approximately 1 cm and 30 cm, or between 1 cm and 20 cm, or between 1 cm and 10 cm.

Such a structure can therefore also optimise the weight and the thickness of the photovoltaic system, and allow the photovoltaic system to reach low mass and dimensional characteristics, facilitating its transport, installation and maintenance.

The ratio between the thickness of the air layer and the dimension of one side of the face of the photovoltaic panel may be less than or equal to approximately $1/10$.

The surface of the face of the photovoltaic panel may be between approximately 0.25 $m^2$ and 2 $m^2$.

The ratio between the thickness of the photovoltaic system and the dimension of one side of the face of the photovoltaic panel may be between approximately $1/7$ and $1/8$.

The battery may be composed of lithium and/or comprise at least one element for storing electrical energy of prismatic shape. The battery may be of the lithium-ion type and comprise several elements for storing electrical energy of prismatic shape electrically connected in series. With this lithium technology, the battery is integrated as best possible into the photovoltaic system and allows the system to have a reduced thickness and weight, in particular when the battery is formed by thin elements, for example prismatic, present under all or a portion of the surface of the photovoltaic panel.

The surface presented by the battery in a plane parallel to the face of the photovoltaic panel intended to receive light rays may be included in the surface presented by said face of the photovoltaic panel in this plane or in another plane parallel to the face of the photovoltaic panel intended to receive light rays. The surface presented by the battery in a plane parallel to the face of the photovoltaic panel intended to receive light rays may be less than or equal, or have a dimension less than or equal, to that of said face of the photovoltaic panel in this plane or in another plane parallel to the face of the photovoltaic panel intended to receive light rays. As such, the photovoltaic panel and the associated open space form a screen protecting thermally the other components of the photovoltaic system arranged behind the photovoltaic panel with regards to the light rays received by the photovoltaic panel.

The photovoltaic system may further include electronic elements for managing and/or converting the electrical energy produced, arranged on a support plate mechanically connected to the battery, the support plate being arranged between the electronic elements and the battery. As such, the photovoltaic system comprises all of its functional components integrated into a single device. The elements for managing and/or converting may also be incorporated on the same plane as the battery, in a free space located between the outside edge of the panel and the battery, the total thickness of these electronic elements being less than or equal to the total thickness of the photovoltaic system.

In the case where the electronic elements for converting and/or managing the electrical energy produced are arranged on a support plate mechanically connected to the battery, the photovoltaic system may further comprise a second space which is opened onto the environment external to the photovoltaic system forming a second air layer and separating the battery and the support plate by a distance at least equal to 1 cm, this distance corresponding to the thickness of the second air layer. More preferably, this distance, or the thickness of the second air layer, may be between approximately 1 cm and 30 cm, or between approximately 1 cm and 20 cm, or between approximately 1 cm and 10 cm. As such, this space can form a space for the circulation of air between the battery and the support plate, i.e. between the battery and the electronic elements. This space formed between the battery and the electronic elements allows a circulation of air preventing the battery from being subjected to increases in temperature due to the heating of the management and/or conversion electronics when they are operating.

The electronic elements for managing and/or converting the electrical energy produced may comprise at least one DC/DC voltage converter, and/or a device for the optimal conversion of energy, and/or a battery charge regulator, and/or a terminal block, and/or a battery discharge regulator, and/or a DC/AC voltage converter, and/or a microcontroller.

The surface presented by the support plate and the electronic elements for managing and/or converting the electrical energy produced, in a plane parallel to the face of the photovoltaic panel intended to receive light rays, may be included in the surface of said face of the photovoltaic panel in this plane or in another plane parallel to the face of the photovoltaic panel intended to receive light rays. The surface presented by the support plate and the electronic elements for managing and/or converting the electrical energy produced, in a plane parallel to the face of the photovoltaic panel intended to receive light rays, may be less than or equal, or have a dimension less than or equal, to that of said face of the photovoltaic panel in this plane or in another plane parallel to the face of the photovoltaic panel intended to receive light rays.

This second space forming the second air layer makes it possible in particular to cool the electronics thanks to the circulation of air in this second space, but also allows for the dilatation of the battery as it ages.

The photovoltaic system further comprises means of dissipating and/or removing heat arranged in the space forming the air layer separating the battery and the photovoltaic panel, and/or in the second space forming the second air layer separating the battery and the support plate when the photovoltaic system comprises this second space.

BRIEF DESCRIPTION OF THE DRAWINGS

This invention shall be better understood when reading the description of example embodiments provided for the purposes of information and in no way restrictive in reference to the annexed drawings wherein.

Identical, similar or equivalent parts in the various figures described hereinafter bear the same reference numbers in such a way as to facilitate passing from one figure to another.

The various parts shown in the figures are not necessary shown according to a uniform scale, in order to render the figures more readable.

The various possibilities (alternatives and embodiments) must be understood as not being exclusive in relation to one another and can be combined together.

DETAILED DESCRIPTION OF PARTICULAR EMBODIMENTS

Figure 4:
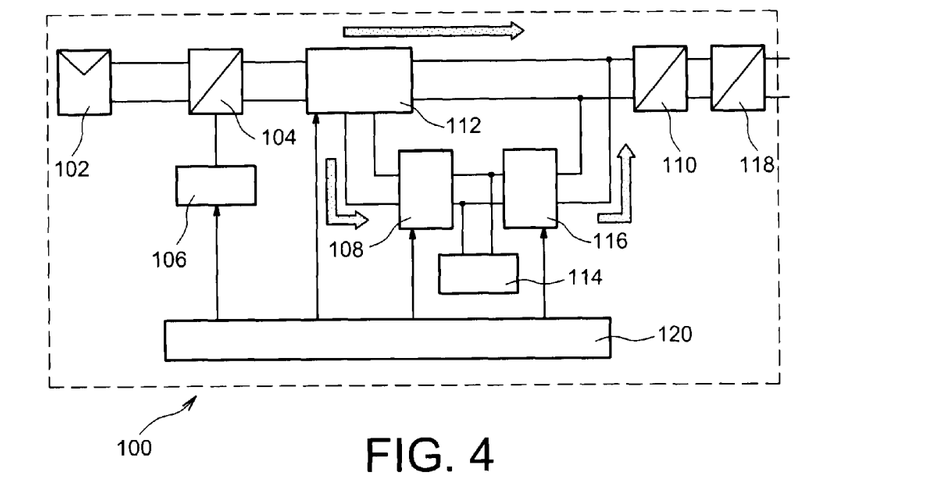
FIG. 4 shows a diagram of a photovoltaic system, object of this invention, according to a particular embodiment.

Reference is made to FIG. 4 which shows a diagram of a photovoltaic system 100, object of this invention, according to a particular embodiment.

The photovoltaic system 100 comprises a photovoltaic panel 102 of which the output is electrically connected to a first DC/DC converter 104. A device for the optimal conversion of energy 106 (also called MPPT or "Maximum Power Point Tracker") is electrically connected to the first DC/DC converter 104. The output of the first DC/DC converter 104 is electrically connected to the input of a battery charge regulator 108 (also called BCR) and to the input of a second DC/DC converter 110 through a terminal block 112. The output of the battery charge regulator 108 is electrically connected to a battery 114, here of the lithium-ion type, and to the input of a battery discharge regulator 116 (also called BDR) which is also electrically connected to the battery 114 and to the input of a second DC/DC converter 110. The output of the second DC/DC converter 110 is electrically connected to the input of a DC/AC voltage converter 118. Finally, the system 100 further comprises a microcontroller 120 controlling in particular the MPPT 106, the terminal block 112, the BCR 108 and the BDR 116.

The tension obtained at the output of the photovoltaic panel 102, for example of 12 V, can be adapted by the DC/DC converter 104 so that the latter corresponds to the nominal voltage of the battery 114. The DC/DC converter 104 is also controlled by the MPPT 106. This MPPT 106 makes it possible to follow the point of maximum power of a non-linear electrical generator. Indeed, the photovoltaic panel 102 can be viewed as a generator of which the characteristic I=f(U) is strongly non-linear. Consequently, for the same lighting, the delivered power will differ according to the charge connected to the output of the panel 102. The MPPT 106 therefore allows to control the static converter (here the DC/DC converter 104) connecting the charge (here the battery 114) and the photovoltaic panel 102 in such a way as to constantly provide the maximum power to the charge. This MPPT 106 is itself controlled by the microcontroller 120.

The microcontroller 120 also controls the terminal block 112 which directs the electrical energy produced either to the battery 114, or to the electric network to which is connected the system 100 or the device intended to be powered by the system 100. The microcontroller 120 also controls the BCR 108 and the BDR 116 which make it possible to regulate the electrical power going into and coming out of the battery 114.

When the terminal block 112 sends the electrical energy produced to the device to be powered or the network, or when the battery delivers electrical energy to the device to be powered or the network, the voltage is then converted by the DC/DC converter 110 then by the DC/AC converter 118, making it possible for example to obtain at the output an AC voltage of 230 V synchronised with the electric network (50 Hz for example).

Figure 5:
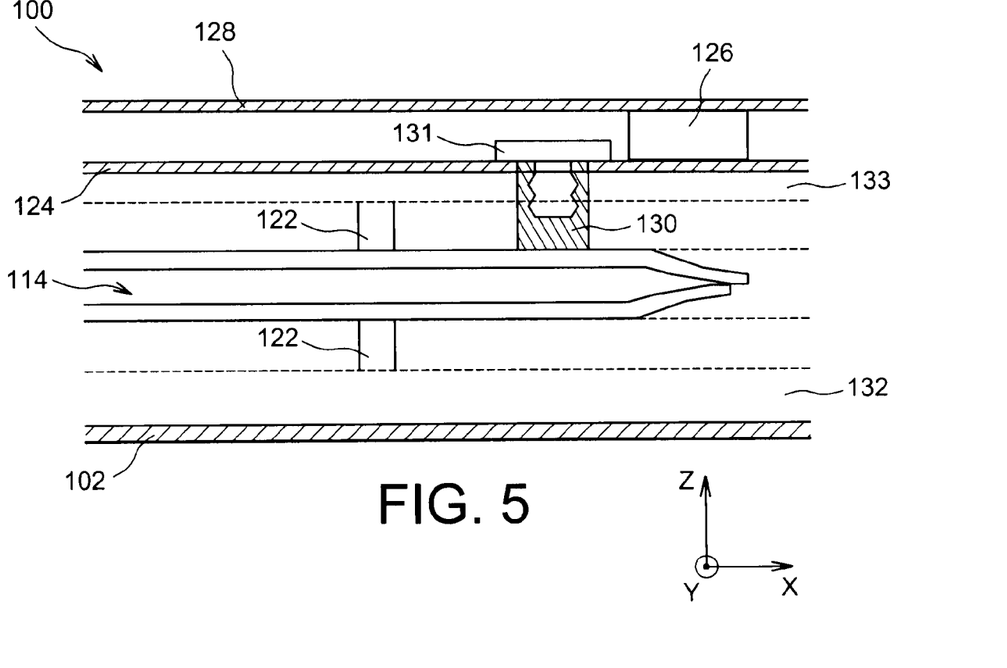
FIG. 5 shows a partial profile cross-section view of a photovoltaic system, object of this invention, according to a particular embodiment.

FIG. 5 shows a partial cross-section profile view of the photovoltaic system 100.

The photovoltaic panel 102 forms the front face of the photovoltaic system 100 which is intended to receive the solar energy. This front face is parallel to the plane (X,Y) according to the axes X and Y shown in FIG. 5. All the components of the system 100 are positioned at the rear of the panel 102 and are superimposed on each other, forming a stack of successive layers, so that the photovoltaic panel 102 forms a thermal protection screen with regards to these components. The battery 114 is here carried out by lithium-ion elements of prismatic shape. The surface of these lithium-ion elements occupied in a plane parallel to the plane (X,Y) is maximised so that the latter corresponds substantially to the surface of the front face of the panel 102, while still remaining protected from the light rays received on the front face of the panel 102. The elements of the battery 114 are maintained with the rest of the system 100 via a mechanical retaining structure 122 which is connected to the photovoltaic panel 102.

In the example described here, the system 100 further comprises a support plate 124, for example epoxy-based, whereon is carried out control electronics 126, for example in the form of an electronic board, comprising the control elements 104, 106, 108, 110, 112, 116, 118 and 120 described hereinabove in liaison with FIG. 4. The electronic board comprises electronic blocks associated to each of these elements and allowing for the management of the charge and of the discharge of the battery, as well as their balancing. The electronic board 126 is screwed to the battery 114 through the support plate 124, directly on the terminals 130 of the battery by a screw 131. As such, this very short connection prevents the ohmic drops which can for example appear if wired connections were used. The energy efficiency and the electrical power of the system are as such optimised. In addition, such a connection via direct screwing on the terminals of the battery is very reliable and easily produced. Finally, a protective plate 128 forms the rear face of the photovoltaic system 100. However, it is possible for the electronic board 126 to be connected to the battery 114 by a wired connection.

The photovoltaic system 100 further comprises a first space 132, forming an air layer, allowing the circulation of air in the system 100, between the photovoltaic panel 102 and the battery 114. The distance formed by the space 132 between these components, (dimension according to the axis z shown in FIG. 5) is for example between approximately 1 cm and 10 cm.

In addition, in this example, the photovoltaic system 100 further comprises a second space 133, forming a second air layer, between the battery 114 and the support plate 124. This second space 133 makes it possible to create a circulation of air between the photovoltaic panel 102 and the support plate 124, i.e. between the photovoltaic panel 102 and the control electronics 126. The battery 114 is maintained at a distance for example between approximately 1 cm and 10 cm from the support plate 124.

The various components of the photovoltaic system 100 are superimposed and separated by the spaces 132, 133, which are here empty spaces, through which the air can circulate, in such a way that the thermal interaction of one component of the system 100 with regards to another component of the system 100 is limited. As such, no component compromises the life span of the other components due to the heat released during the operation of the system 100 by these components, and in particular of the photovoltaic panel 102 and of the control electronics 126 which are the components that generally release the most heat of all the components of the system 100.

Figure 6:
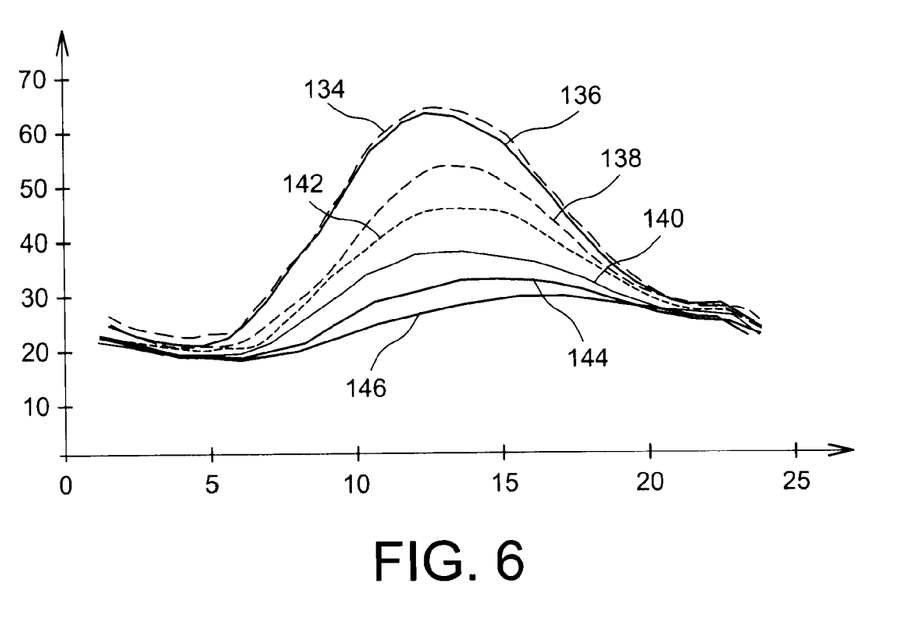
FIG. 6 shows curves showing the change, over one day of operation, in the temperature of the components of a photovoltaic system, object of this invention, according to the spacing between these components.

The curves shown in FIG. 6 describe the change in the maximum temperature of the battery 114 and of the photovoltaic panel 102 according to the time during a summer day. The curves 134 and 136 show respectively the changes in temperatures of the photovoltaic panel 102 and of the battery 114 when the spaces 132, 133 do not exist, the battery 114 being in this case platted against the photovoltaic panel 102 and against the support plate 124. The curves 138 and 140 show respectively the changes in temperatures of the photovoltaic panel 102 and of the battery 114 when the spaces 132, 133 have a thickness equal to approximately 1 cm, the curves 142 and 146 showing the changes of these same components when the spaces 132, 133 have a thickness equal to approximately 5 cm. The curve 146 shows the change in the ambient temperature during this day.

These curves correspond to a study conducted in a stationary manner, in a two-dimensional plane, with the photovoltaic panel 102, the battery 114 and the spaces 132, 133 being assimilated to three rectangular parallelepipeds of the same lengths and of the same widths, with the heat exchanges between the retaining structure 122 and the rest of the system 100 being overlooked, and the energy dissipated in the form of heat in the battery that is operating being overlooked.

It is observed in this FIG. 6 that all of the curves are superimposed at night. However, the temperature of the photovoltaic panel 102 increases with the period of sunshine due to the light rays received on the photovoltaic panel 102. The temperature of the photovoltaic panel 102 also increases due to the transformation of the solar energy into electrical energy carried out by the panel 102. The temperature of the battery 114 increases with the period of sunshine and with the heat emitted by the panel 102. It is observed that without the spaces 132, 133 (curves 134, 136), the temperature of the battery 114 corresponds approximately to that of the photovoltaic panel 102 which is, at the hottest hours of the day, a temperature between approximately 60° C. and 65° C. With spaces 132, 133 of a thickness equal to approximately 1 cm, the maximum temperature reached by the photovoltaic panel 102 then falls by approximately 7° C. (curve 138) and that of the battery 114 falls by approximately 25° C. (curve 140) compared to the configuration without the empty spaces 132, 133. For a thickness of spaces 132, 133 equal to approximately 5 cm, the maximum temperature reached by the photovoltaic panel 102 falls approximately 18° C. (curve 142) and that of the battery 114 falls approximately 33° C. (curve 144) compared to the configuration without the spaces 132, 133. The daily gradient (difference between the highest temperature and the coldest temperature) also falls for the battery 114 and the panel 132 for the two thicknesses of spaces 132, 133.

It is therefore seen that thanks to the presence of spaces 132, 133 forming layers of air, the thermal impact of the photovoltaic panel 102 and of the control electronics 126 on the battery 114 is substantially reduced. The thermal constraints that the battery 114 is subjected to during its operation are less severe, reducing the impact of these thermal constraints on its life span. The spaces 132, 133 also limit the maximum temperature reached by the photovoltaic panel 102, thus providing better daily production of electrical energy as the efficiency of the photovoltaic panel 102 is better at low temperature.

This integration of spaces for the circulation of air between the photovoltaic panel and the battery, and between the battery and the other components of the system 100 makes it possible to achieve comparable durations in life between the various components of the system 100, estimated at a minimum of 15 years, period during which the initial levels of performance are satisfactory. Beyond this and up to approximately 30 years, a slight deterioration in performance is possible. In order to retain reduced maintenance, this disadvantage is taken into account by the dimensioning of the battery 114 which makes it possible to respond to the needs of the application over a longer duration of time as is described hereinbelow.

The thickness of one of the spaces 132, 133 is at least equal to approximately 1 cm in order to limit the thermal impact of the photovoltaic panel 102 over the life span of the battery 114. In addition, this thickness is for example chosen to be less than or equal to 10 cm in order to limit the encumbrance in the system 100 with regards to the level of integration desired.

Figure 7A:
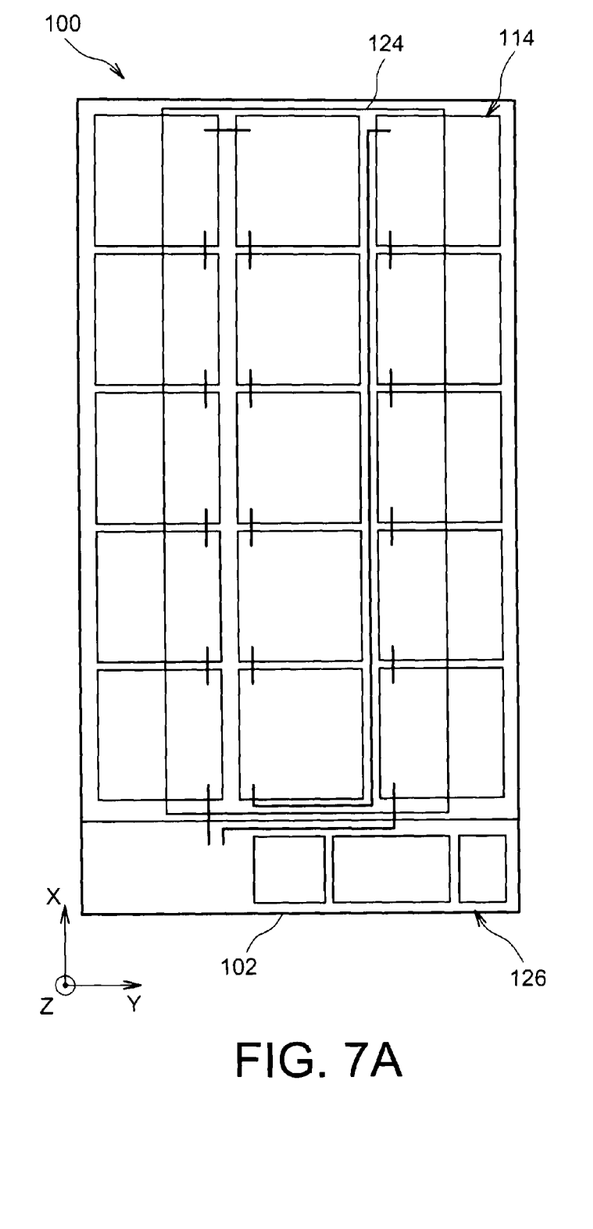
FIGS. 7A and 7B show cross-section views of a photovoltaic system, object of this invention, according to a particular embodiment.
Figure 7B:
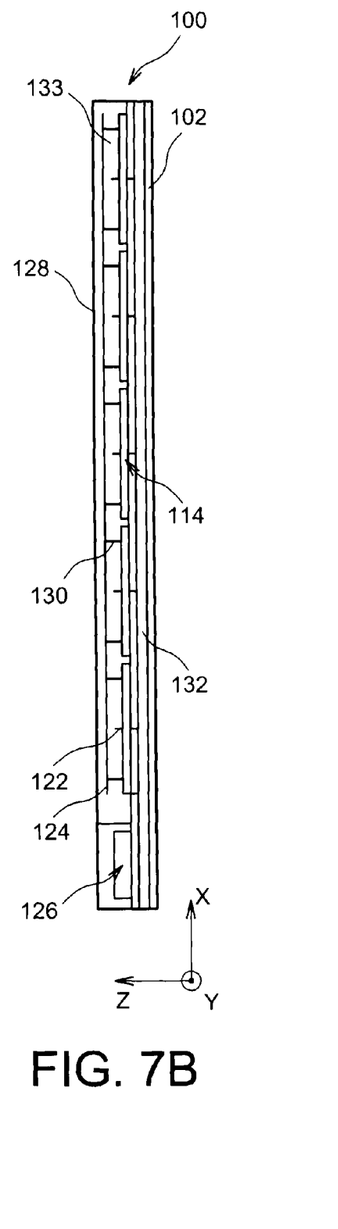

FIGS. 7A and 7B show detailed cross-section views of the system 100. The references indicated on these figures correspond to those of FIGS. 4 and 5.

The photovoltaic panel 102 has for example a nominal power equal to approximately 75 Wc (peak Watt), and overall dimensions equal to approximately 1237 mm×556 mm×24.5 mm, for a total weight of 7.8 kg. Such a panel makes it possible to obtain on the average a daily production of electricity equal to approximately 350 Wh (with an efficiency of 13% of the panel), which is approximately 125 kWh per year.

Generally, the surface of the face of the photovoltaic panel 102 intended to receive the light rays is between approximately 0.25 m$^2$ and 2 m$^2$, the dimensions of the sides of the panel 102, for example of rectangular shape and possible extended or square, being between approximately 0.5 m and 2 m. The output power of the photovoltaic panel 102, which is directly proportional to the surface intended to receive the light rays and to the technology used, is between a few tens of W and approximately 250 W. The panel 102 may include photovoltaic cells composed of single-crystalline silicon, polycrystalline silicon, amorphous silicon, and/or in thin layers. Finally, the panel 102 may be fixed on a metal frame or integrated in the form of solar tiles. The thickness of panel 102 may be between approximately 24 mm and 50 mm.

The dimensioning of the battery 114 is carried out by taking into account the quantity of electricity that can be produced by the photovoltaic panel 102, as well as flows of energy intended to circulate in the battery 114.

Such a photovoltaic system 100 is for example intended, when the latter is used with a home connected to the electric network and consuming on the average 2 kW, to handle the peaks in consumption which take place at midday (1000 Wh) and in the evening (2000 Wh). The photovoltaic system 100 can also provide in addition the supply of electricity in the event of an electrical cut-off (for example approximately 1000 Wh for one-half hour). This home may for example be provided with 25 photovoltaic systems similar to the photovoltaic system 100, each comprising a photovoltaic panel of which the nominal power is equal to approximately 75 Wc, which is a total of 1875 Wc for the 25 photovoltaic panels.

A cycle that is representative of the operation of photovoltaic systems of this home can for example take place over 4 days. The first day, each of the photovoltaic systems can produce approximately 350 Wh. As the batteries are initially charged to 100%, the electrical energy produced is then either consumed in the home, or sold to the electric network manager. The batteries provide the excess consumption of the evening, which is approximately 80 Wh per photovoltaic system. The second day, the systems do not produce electricity (no sunlight). In this case, the batteries provide the excess consumption at noon and in the evening, as well as a consumption of 2 kW for a one-half hour cut-off of the electric network, which is a total of 160 Wh per photovoltaic system. The third jour, the photovoltaic systems do not produce electricity (no sunlight). The batteries provide the excess consumption at noon and in the evening, which is approximately 120 kW per photovoltaic system. The fourth day, each of the photovoltaic systems produces approximately 350 Wh. All of the electricity produced by the photovoltaic panels is used to recharge the batteries.

It is therefore seen, according to this operating cycle, that the electrical energy available is equal to approximately 350 Wh. In order to provide this value at the end of the life, the initial storage capacity of the batteries is therefore equal to approximately 480 Wh.

In the example shown in FIGS. 7A and 7B, the battery 114 is formed by 15 lithium-ion elements of prismatic shape, making it possible to cover a large portion of the available surface of the photovoltaic panel 102 in the plane (x, y). The dimensions of each of the elements of the battery 114 are as follows: width (dimension according to the axis y)=185 mm; length (dimension according to the axis x)=145 mm; thickness (dimension according to the axis z)=10 mm. Each of these elements has a nominal capacity of 10 Ah. The number, the dimensions and the arrangement of these elements may in particular be choose according to the technological nature of the battery 114 (for example here lithium-ion), defining the nominal voltages of the elements and as such making it possible to obtain the specified energy. Generally, the thickness of the battery may be between approximately 10 mm and 40 mm. In addition, the elements of the retaining structure 122 mechanically connecting the battery 114 to the photovoltaic panel 102 may have a dimension, parallel to the thicknesses of the panel 102 and of the battery 114, between approximately 10 mm and 25 mm.

The total mass of the system 100 is here less than 30 kg. Its dimensions in length and in width (dimensions according to the axes x and y) correspond to those of the single photovoltaic panel 102, and for example equal to 1237 mm in length and 556 mm in width. The total thickness of the system 100 is for example equal to approximately 60.5 mm, and may be between approximately 60 mm and 240 mm.

Generally, the dimensions, the configuration and the number of elements of the battery will be chosen according to the energy needs that the photovoltaic system must satisfy, whether for an application of the isolated type (urban furniture for example), or of the type connected to the network as shown in the example. The higher the power of the photovoltaic system, and therefore a substantial surface, the higher the battery 114 will be in terms of capacity, the thicker the air layer will be and the larger the retaining structure will be. For a low-power photovoltaic panel of which the dimensions of the sides are equal to approximately 0.5 m, the thickness of the system is for example equal to approximately 66 mm. The ratio between the thickness of the photovoltaic system and the dimension of one side of the face of the photovoltaic panel is therefore equal to approximately ⅐. For a high-power photovoltaic panel of which the dimensions of the sides are equal to approximately 2 m, the thickness of the system is for example equal to approximately 240 mm. The ratio between the thickness of the photovoltaic system and the dimension of one side of the face of the photovoltaic panel is therefore equal to approximately ⅛.

The spaces 132, 133 previously described are empty in order to allow for a circulation of air in the photovoltaic system, in particular around the battery. In an alternative, it is possible for the spaces 132, 133 not to be empty, but include devices for removing or dissipating heat, possibly arranged against the components that release heat as for example the photovoltaic panel 102 or the control electronics 126 (or the support plate 124). Such devices may for example include heat dissipation vanes, and/or any other device making it possible to improve the dissipation of the heat and/or accelerate the removal of the heat to the exterior of the photovoltaic system 100.

The invention claimed is:

1. A photovoltaic system comprising:
a photovoltaic panel comprising a face configured to receive light rays;
a battery mechanically connected to the photovoltaic panel by a retaining structure;
a first space which is opened onto the environment external to the photovoltaic system forming an air layer separating the battery and the photovoltaic panel and comprising a thickness at least equal to approximately 1 cm;
a plurality of electronic elements for managing and/or for converting electrical energy produced arranged on a support plate mechanically connected to the battery, the support plate being arranged between the electronic elements and the battery; and
a second space which is opened onto the environment external to the photovoltaic system forming a second air layer separating the battery and the support plate and comprising a thickness at least equal to approximately 1 cm,
the ratio between the thickness of the photovoltaic system and a dimension of one side of the face of the photovoltaic panel being less than or equal to approximately ⅕.

2. The photovoltaic system according to claim 1, wherein the thickness of the air layer is between approximately 1 cm and 10 cm.

3. The photovoltaic system according to claim 1, wherein the ratio between the thickness of the air layer and the dimension of one side of the face of the photovoltaic panel is less than or equal to approximately 1/10.

4. The photovoltaic system according to claim 1, wherein the surface of the face of the photovoltaic panel is between approximately 0.25 m² and 2 m².

5. The photovoltaic system according to claim 1, wherein the ratio between the thickness of the photovoltaic system and the dimension of one side of the face of the photovoltaic panel is between approximately 1/7 and 1/8.

6. The photovoltaic system according to claim 1, wherein the battery is composed of lithium.

7. The photovoltaic system according to claim 6, wherein the battery comprises at least one element for storing electrical energy of prismatic shape.

8. The photovoltaic system according to claim 1, wherein the battery is of lithium-ion type and comprises plural elements for storing electrical energy of prismatic shape electrically connected in series.

9. The photovoltaic system according to claim 1, wherein a surface presented by the battery in a plane parallel to the face of the photovoltaic panel is less than or equal to a surface of the face of the photovoltaic panel in this plane.

10. The photovoltaic system according to claim 1, wherein the thickness of the second air layer is between approximately 1 cm and 10 cm.

11. The photovoltaic system according to claim 1, wherein the electronic elements for managing and/or for converting the electrical energy produced comprise at least DC/DC voltage converter, and/or a device for optimal conversion of energy, and/or a battery charge regulator, and/or a terminal block, and/or a battery discharge regulator, and/or a DC/AC voltage converter, and/or a microcontroller.

12. The photovoltaic system according to claim 1, wherein a surface presented by the support plate and the electronic elements for managing and/or converting the electrical energy produced, in a plane parallel to the face of the photovoltaic panel, is less than or equal to the surface of the face of the photovoltaic panel in this plane.

13. The photovoltaic system according to claim 1, further comprising means for dissipating and/or removing heat arranged in the air layer separating the battery and the photovoltaic panel, and/or in a second air layer separating the battery and the support plate when the photovoltaic system comprises the second air layer.

* * * * *